(12) United States Patent
Cornett et al.

(10) Patent No.: US 9,536,348 B2
(45) Date of Patent: Jan. 3, 2017

(54) SYSTEM AND METHOD FOR DISPLAYING VIDEO SURVEILLANCE FIELDS OF VIEW LIMITATIONS

(75) Inventors: Alan Cornett, Andover, MN (US); Robert Charles Becker, Eden Prairie, MN (US); Andrew H. Johnson, New Brighton, MN (US)

(73) Assignee: Honeywell International Inc., Morris Plains, NJ (US)

( * ) Notice: Subject to any disclaimer, the term of this patent is extended or adjusted under 35 U.S.C. 154(b) by 883 days.

(21) Appl. No.: 12/487,405

(22) Filed: Jun. 18, 2009

(65) Prior Publication Data

US 2010/0321492 A1    Dec. 23, 2010

(51) Int. Cl.
*H04N 7/18*     (2006.01)
*G06T 17/05*    (2011.01)
*G06T 11/00*    (2006.01)
*G08B 13/196*   (2006.01)

(52) U.S. Cl.
CPC .............. *G06T 17/05* (2013.01); *G06T 11/00* (2013.01); *G08B 13/19641* (2013.01)

(58) Field of Classification Search
CPC ..... G06T 11/00; G06T 17/05; G08B 13/19641
See application file for complete search history.

(56) References Cited

U.S. PATENT DOCUMENTS

| | | | |
|---|---|---|---|
| 5,329,310 A * | 7/1994 | Liljegren et al. | 348/147 |
| 6,396,535 B1 * | 5/2002 | Waters | 348/159 |
| 6,759,979 B2 * | 7/2004 | Vashisth et al. | 342/357.31 |
| 6,816,073 B2 * | 11/2004 | Vaccaro et al. | 340/541 |
| 6,826,452 B1 * | 11/2004 | Holland et al. | 700/245 |
| 7,027,616 B2 * | 4/2006 | Ishii et al. | 382/104 |
| 7,295,925 B2 * | 11/2007 | Breed et al. | 701/301 |
| 7,725,258 B2 * | 5/2010 | Smitherman | 701/213 |
| 7,738,008 B1 * | 6/2010 | Ball | 348/159 |
| 7,787,013 B2 * | 8/2010 | Yoshida et al. | 348/159 |
| 7,983,836 B2 * | 7/2011 | Breed | 701/117 |
| 8,878,835 B2 * | 11/2014 | Birtwistle | G06T 11/001 345/418 |
| 9,036,028 B2 * | 5/2015 | Buehler | G08B 13/19602 348/159 |
| 2006/0077255 A1 * | 4/2006 | Cheng | 348/143 |

(Continued)

*Primary Examiner* — Nhon Diep

(74) *Attorney, Agent, or Firm* — Schwegman Lundberg & Woessner, P.A.

(57) ABSTRACT

A system and method are provided for displaying video surveillance fields of view limitations. The system and method perform video surveillance of a given area and then geo-locate any obstacles within the area, including measuring their overall size and shape. The system and method map the size, location and shape of the objects into a database and then identify where there are video surveillance coverage gaps from each vantage point where video surveillance is being performed on the area. The system and method then determine where there are overlapping locations of blocked video surveillance (i.e., locations that are "invisible" to video surveillance). The system and method create a simulated image of the area from an orientation above the area which indentifies locations within the area that may not be seen by video surveillance from any of the vantage points where video surveillance is being performed.

20 Claims, 7 Drawing Sheets

(56) References Cited

U.S. PATENT DOCUMENTS

| | | | |
|---|---|---|---|
| 2010/0030474 A1* | 2/2010 | Sawada | G08G 1/163 |
| | | | 701/301 |
| 2010/0053330 A1* | 3/2010 | Hellickson et al. | 348/153 |
| 2010/0208941 A1* | 8/2010 | Broaddus | G01S 3/7864 |
| | | | 382/103 |
| 2013/0222375 A1* | 8/2013 | Neophytou | G06K 9/00214 |
| | | | 345/419 |

* cited by examiner

SYSTEM AND METHOD FOR DISPLAYING VIDEO SURVEILLANCE FIELDS OF VIEW LIMITATIONS

BACKGROUND

One of the drawbacks with using video surveillance to monitor a location is that it can be difficult to determine where there are coverage gaps in the surveillance. This difficulty is exacerbated when reconciling surveillance coverage from multiple viewpoints (i.e., when several video cameras are used to cover an area from multiple locations).

The video cameras in a typical security system are usually placed such that all of the scenes which are viewed by the cameras overlap to some extent. However, there are often areas where one or more obstacles block a portion of the field of view of one camera and the remaining cameras are unable to provide adequate surveillance of the blocked area. These gaps in the video surveillance may not be readily apparent when camera data is viewed by security personnel.

One method that is used to minimize the size and number of blocked video coverage areas is to place surveillance cameras at optimal locations such that the effect of obstacles is minimized. The placement of cameras in these desired positions can often be problematic because there may be no infrastructure or supporting structures that exist at these locations making it difficult and/or expensive to adequately mount the video cameras. In addition, even if special arrangements are made to place cameras at these locations, there are typically unforeseen areas of blocked coverage.

Another of the current methods that is used to minimize the size and number of blocked video coverage areas is to place multiple cameras in an area and use rotating field of views for each of the cameras. One of the shortcomings associated with using rotating field of views for each of the cameras is that events in the field of view of the camera can transpire when the camera is not pointing where the events occur. Security personal monitoring multiple screens, and particularly screens with rotating fields of view, frequently fail to detect activity on those screens. In addition, even when rotating field of views are used for each of the cameras, there are typically unforeseen areas of blocked coverage.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software, hardware and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A system and method are provided for displaying video surveillance fields of view limitations. In some embodiments, the system and method perform video surveillance of a given area and then geo-locate any obstacles within the area, including measuring their overall size and shape. The system and method further map the size, location and shape of the objects into a database and then identify where there are video surveillance coverage gaps from each vantage point where video surveillance is being performed on an area.

The system and method then determine where there are overlapping locations of blocked video surveillance (i.e., locations that are "invisible" to video surveillance). The system and method create a simulated image of the area from an orientation above the area which indentifies locations within the area that may not be seen by video surveillance from any of the vantage points where video surveillance is being performed. The simulated image provides a vivid display of those locations within the area that are vulnerable to inadequate video monitoring.

Figure 1:
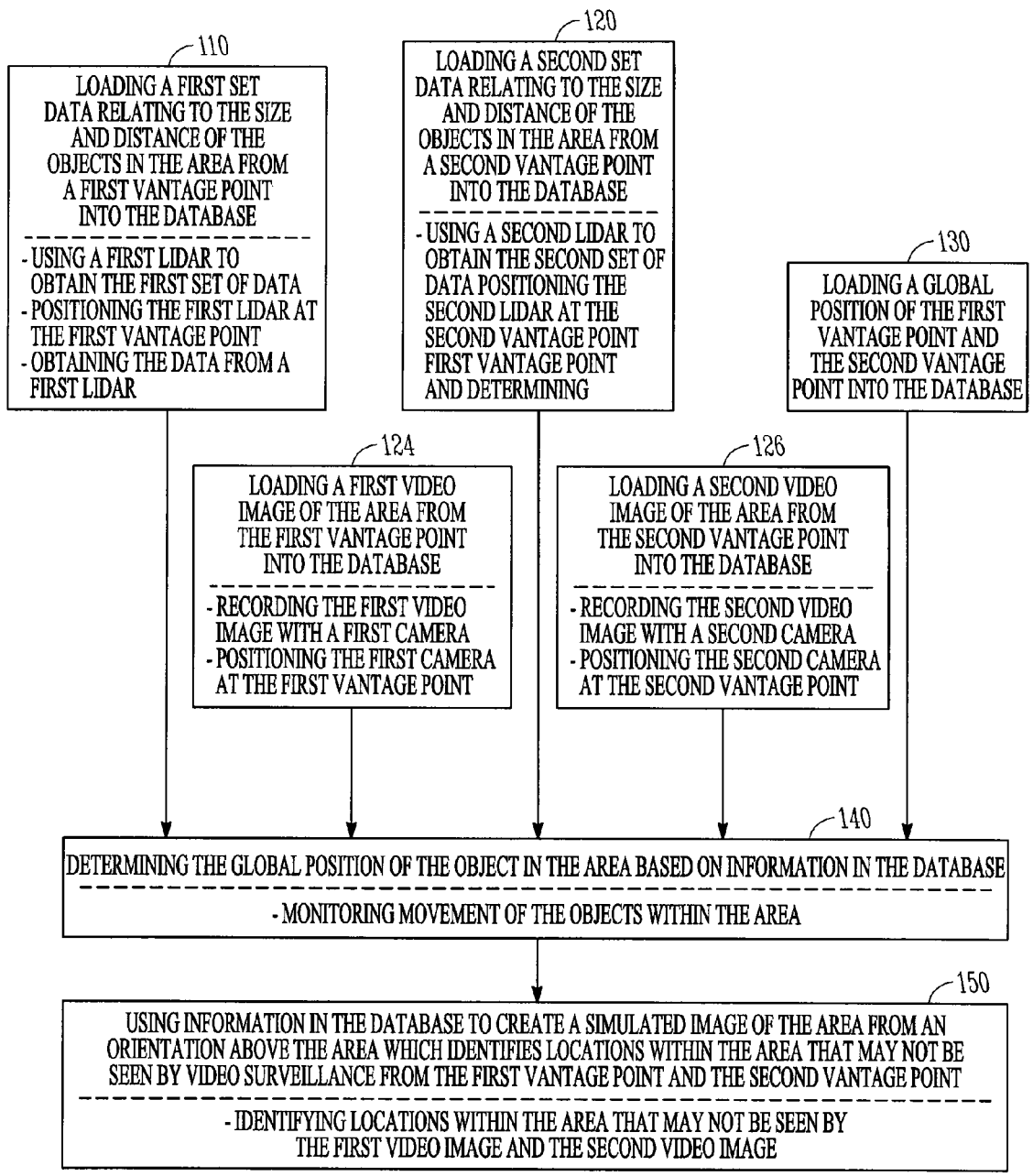
FIG. 1 is a flowchart illustrating a method for displaying video surveillance fields of view limitations according to an example embodiment.

FIG. 1 is a flowchart illustrating a method 100 for addressing video surveillance field of view limitations according to an example embodiment. The method 100 comprises activity 110 which includes loading a first set of data relating to the size and distance of objects in an area from a first vantage point into a database; activity 120 which includes loading a second set data relating to the size and distance of the objects in the area from a second vantage point into the database; activity 130 which includes loading a global position of the first vantage point and the second vantage point into the database; activity 140 which includes determining a global position of the objects in the area based on information in the database; and activity 150 which includes using information in the database to create a simulated image of the area from an orientation above the area which indentifies locations within the area that may not be seen by video surveillance from the first the vantage point and the second vantage point (see, e.g., FIG. 3).

In some example embodiments, the activity 110 of loading the first set of data into the database and the activity 120 of loading the second set of data into the database may include using a lidar (i.e., Light Detection and Ranging or Laser Imaging Detection and Ranging (system), or Laser Identification Detection and Ranging or Laser Induced Differential Absorption Radar) to obtain the first set of data and the second set of data. As an example, the activity 110 of loading the first set of data into the database may include using a first lidar to obtain the first set of data and the activity 120 of loading the second set of data into the database may include using a second lidar to obtain the second set of data. In addition, using the first lidar to obtain the first set of data includes may include positioning the first lidar at the first vantage point and using the second lidar to obtain the second set of data may include positioning the second lidar at the second vantage point. It should be noted that in some embodiments, using the first lidar to obtain the first set of data may be done simultaneously with using the second lidar to obtain the second set of data.

The method 100 may further include the activity 124 which includes loading a first video image of the area from the first vantage point into the database and the activity 126 which includes loading a second video image of the area from the second vantage point into the database. When these types of first and second video images are loaded into the database, the activity 150 of using information in the database to create a simulated image of the area from an orientation above the area which indentifies locations within the area that may not be seen by video surveillance from the first the vantage point and the second vantage point may include indentifying locations within the area that may not be seen by the first video image and the second video image.

In some example embodiments, the activity 124 of loading a first video image of the area may include recording the first video image with a first camera, and the activity of loading a second video image of the area may include recording the second video image with a second camera. It should be noted that recording the first video image may be done simultaneously with recording the second video image. In addition, recording the first video image with the first camera may include positioning the first camera at the first vantage point and recording the second video image with the second camera may include positioning the second camera at the second vantage point.

In some example embodiments, activity 130 which includes loading a global position of the first vantage point and the second vantage point into the database may further include determining the global position of the first vantage point and determining the global position of the second vantage point. As an example, determining the global position of the first vantage point may be done simultaneously with determining the global position of the second vantage point by using a global positioning system that includes components which are located at the first vantage point and the second vantage point.

In some example embodiments, the activity 140 of determining a global position of the objects in the area based on information in the database may include monitoring movement of the objects within the area. The determination may be based on knowing the global position of the first vantage point and the second vantage point as well as continuously monitoring the locations of the objects in the area relative to the first vantage point and the second vantage point.

One example of where this may be useful is for areas such as shipping ports where stacks of shipping containers are constantly moving in and out of a port (i.e., a surveillance area). As the containers stack up or are moved, there will be changing gaps in the coverage of the video surveillance system.

Figure 2:
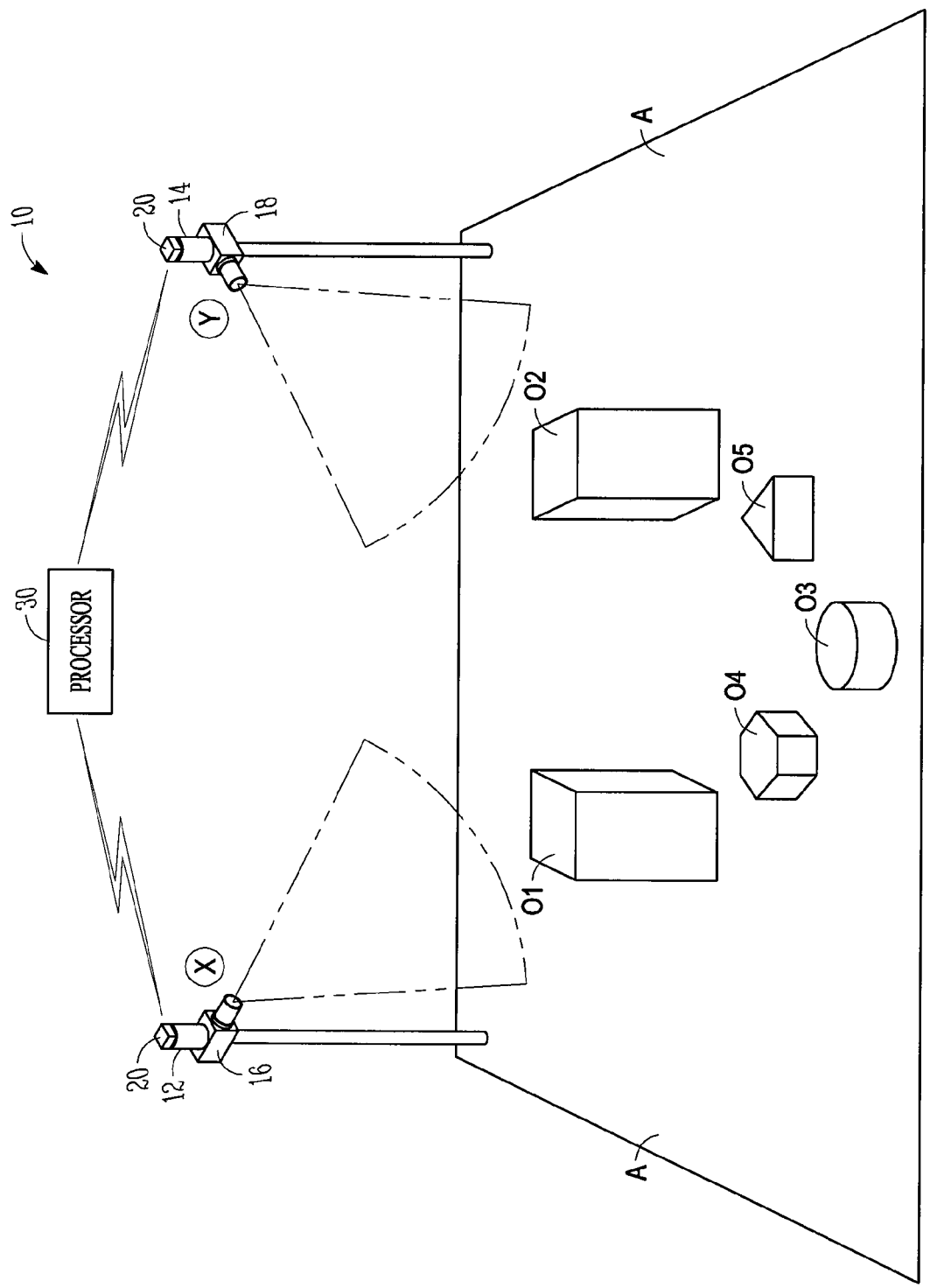
FIG. 2 illustrates a system for displaying video surveillance fields of view limitations according to an example embodiment.

FIG. 2 illustrates a video surveillance system 10 according to an example embodiment. The video surveillance system 10 includes a first lidar 12 that is located at a first vantage point X and a second lidar 14 that is located at a second vantage point Y.

The video surveillance system 10 further includes a global positioning system 20 that detects the global position of the first lidar 12 and the second lidar 14. The global positioning system 20 and the first and second lidars 12, 14 are used to globally locate objects O1, O2, O3, O4, O5 within an area A that is being monitored by video surveillance and determines the size and shape of the objects O1, O2, O3, O4, O5.

Figure 3:
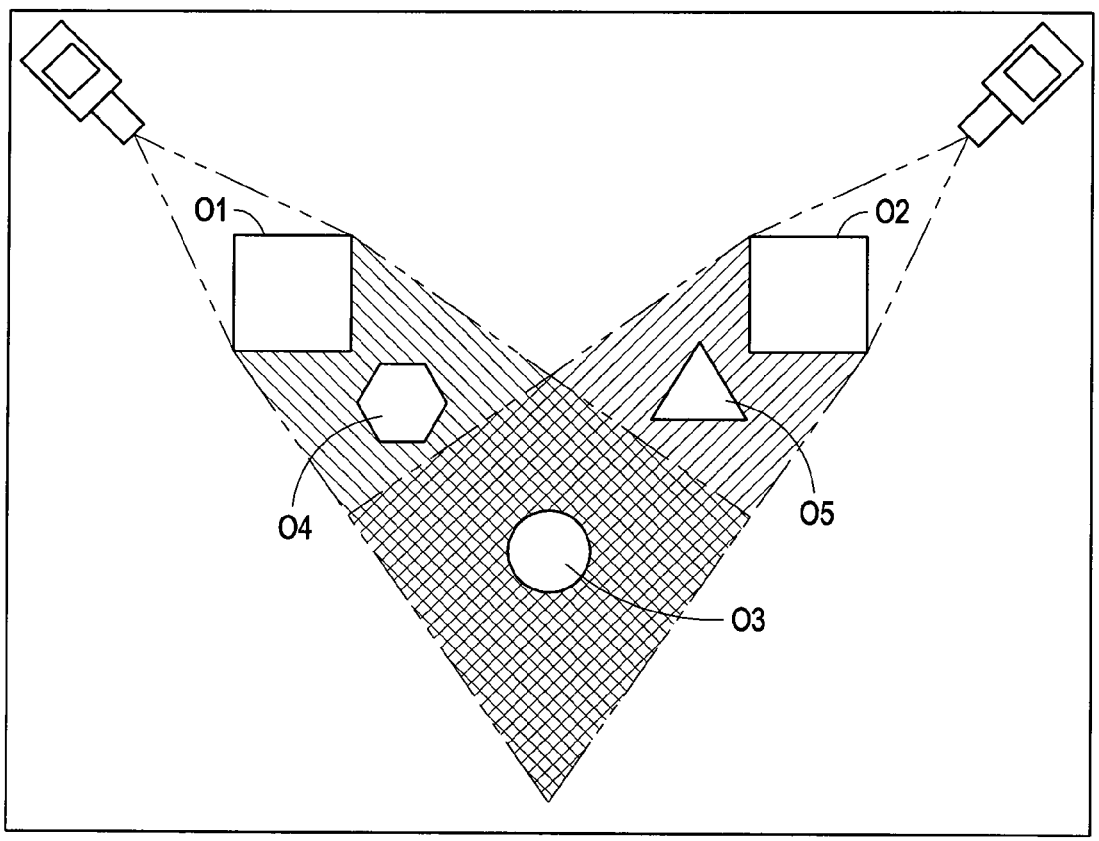
FIG. 3 illustrates an example simulated image that may be generated by the system and method for the area that is shown in FIG. 2.

The video surveillance system 10 further includes a processor 30 that receives data from the first lidar 12, the second lidar 14 and the global positioning system 20. Based on the received data, the processor 30 creates a simulated image of the area from an orientation above the area A which indentifies locations within the area that may not be seen by video surveillance from the first vantage point and the second vantage point. FIG. 3 illustrates an example simulated image that may be generated for the area A and objects O1, O2, O3, O4, O5 using the lidars 12, 14 that are shown in FIG. 2.

The video surveillance system 10 may further include a first camera 16 that is located at the first vantage point X and a second camera 18 that is located at the second vantage point Y. The size, shape and location of the objects O1, O2, O3, O4, O5 within the area A may be correlated with video images that are taken from the first and second video cameras 16, 18. In addition, the global positioning system 20 may be mounted on the first camera 16 and the global positioning system 20 may be mounted on the second camera 18.

Figure 4:
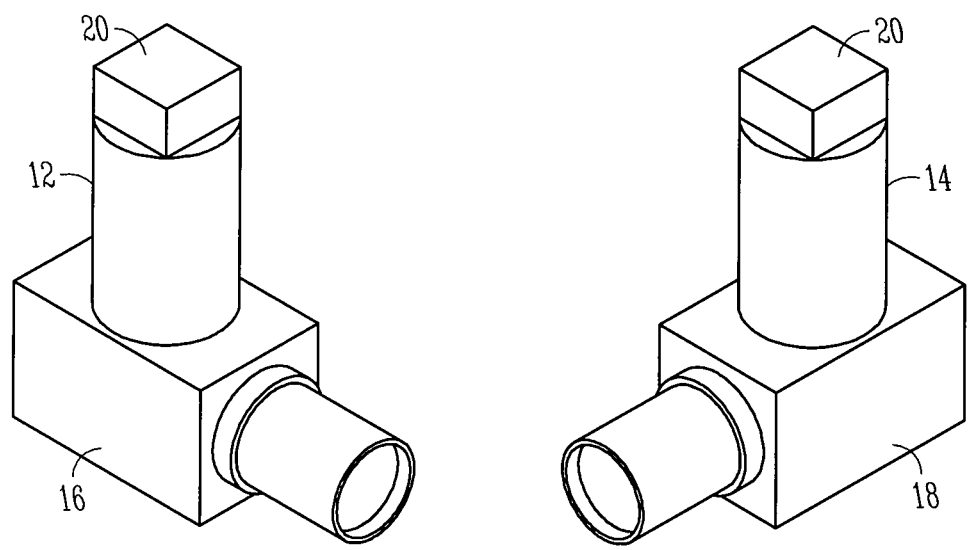
FIG. 4 shows examples of a lidar and camera combination.

FIG. 4 shows examples of a lidar and camera combination. In the illustrated example embodiments, the first camera 16 is mounted to the first lidar 12 and the second camera 18 is mounted to the second lidar 14 such that the global positioning system 20 is mounted to both the first camera 16 and the first lidar 12 and the global positioning system 20 is mounted to both the second camera 18 and the second lidar 14.

When the first and second lidars 12, 14 are mounted on the first and second cameras 16, 18 (or vice versa), the surveillance system 10 may be able to continuously update the data to display those areas that are blocked from video surveillance by the first and second cameras 12, 14 from an orientation above the area. In some example embodiments, the first video camera 16 and the second video camera 18 simultaneously send data to the processor 30 and/or the first lidar 12 and the second lidar 14 simultaneously send data to the processor 30. In addition, the global positioning system 20 may simultaneously send data to the processor 30 along with the first and second lidar 12, 14 and/or the first and second video cameras 16, 18.

As discussed above, one example of where this may be useful is for areas such as shipping ports where stacks of shipping containers are constantly moving in and out of a port (i.e., a surveillance area). As the containers stack up or are moved, there will be changing gaps in the video surveillance.

Figure 5:
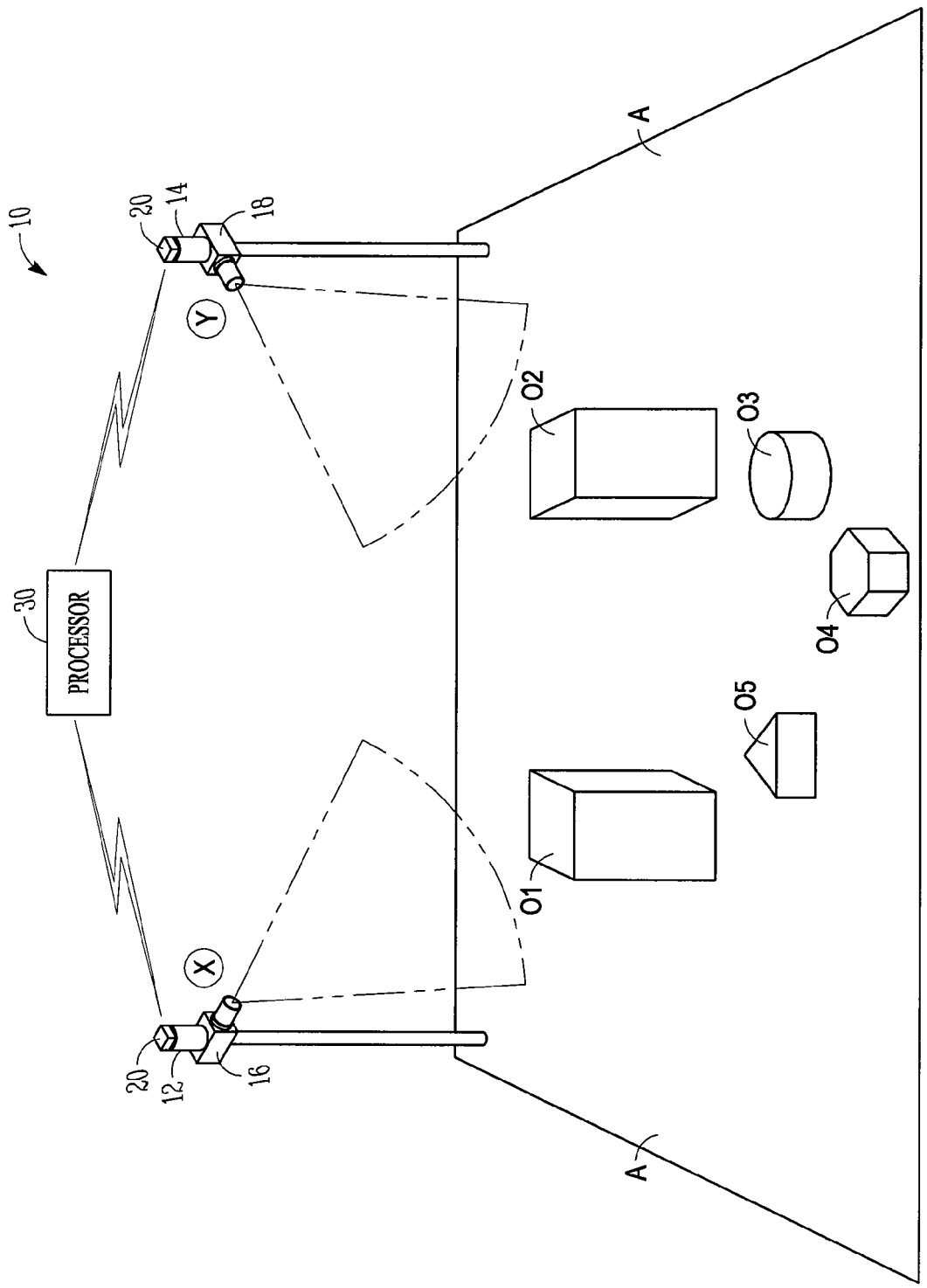
FIG. 5 illustrates the system of FIG. 2 where objects within the surveillance area have been moved.
Figure 6:
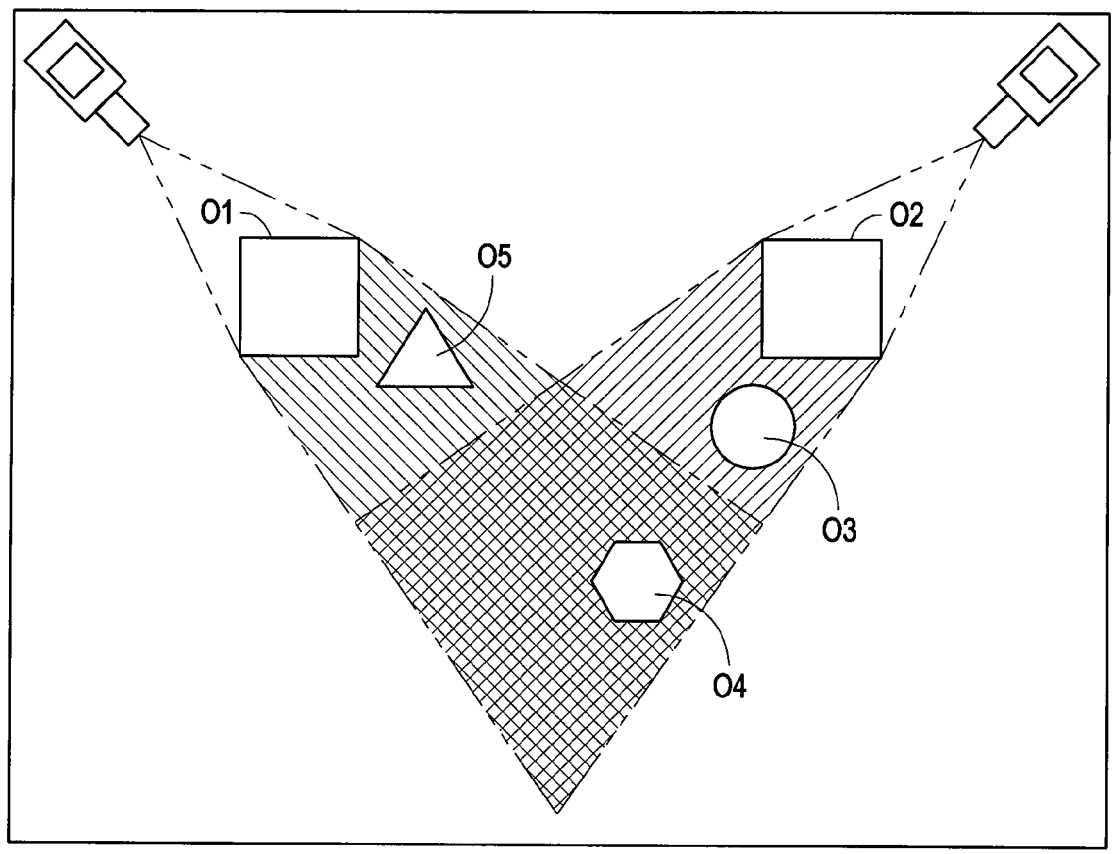
FIG. 6 illustrates an example simulated image that may be generated by the system and method for the area that is shown in FIG. 5.

FIG. 5 shows an example of where some of the objects O3, O4, O5 shown in FIG. 2 have moved within the area A relative to the first and second lidars 12, 14 and the first and second cameras 16, 18. FIG. 6 illustrates an example simulated image that may be generated for the area A and objects O1, O2, O3, O4, O5 using the lidars 12, 14 that are shown in FIG. 5.

Although not explicitly shown in the FIGS., the first and second lidars 12, 14 and the first and second cameras 16, 18 are able to monitor when a portion of an object may be moved within, or removed from, the area A. As an example, the system 10 is able to monitor when one or more containers in a stack of containers is removed from the rest of the stack of containers.

It should be noted that embodiments are contemplated where only a single lidar and/or camera combination is used to supply data to the processor 30 relating to the size and distance of objects in the area A from the first vantage point X and then subsequently supply data relating to the size and distance of objects in the area A from the second vantage point Y. In addition, a single component in the global positioning system 20 may be used to supply the global position of the first and second vantage points X, Y to the processor 30.

Embodiments are also contemplated where multiple lidars and/or cameras are used to supply data to the processor 30 relating to the size and distance of objects in the area A from multiple vantage points. In addition, multiple components in the global positioning system 20 may be used to supply the global positions of the multiple vantage points to the processor 30.

Figure 7:
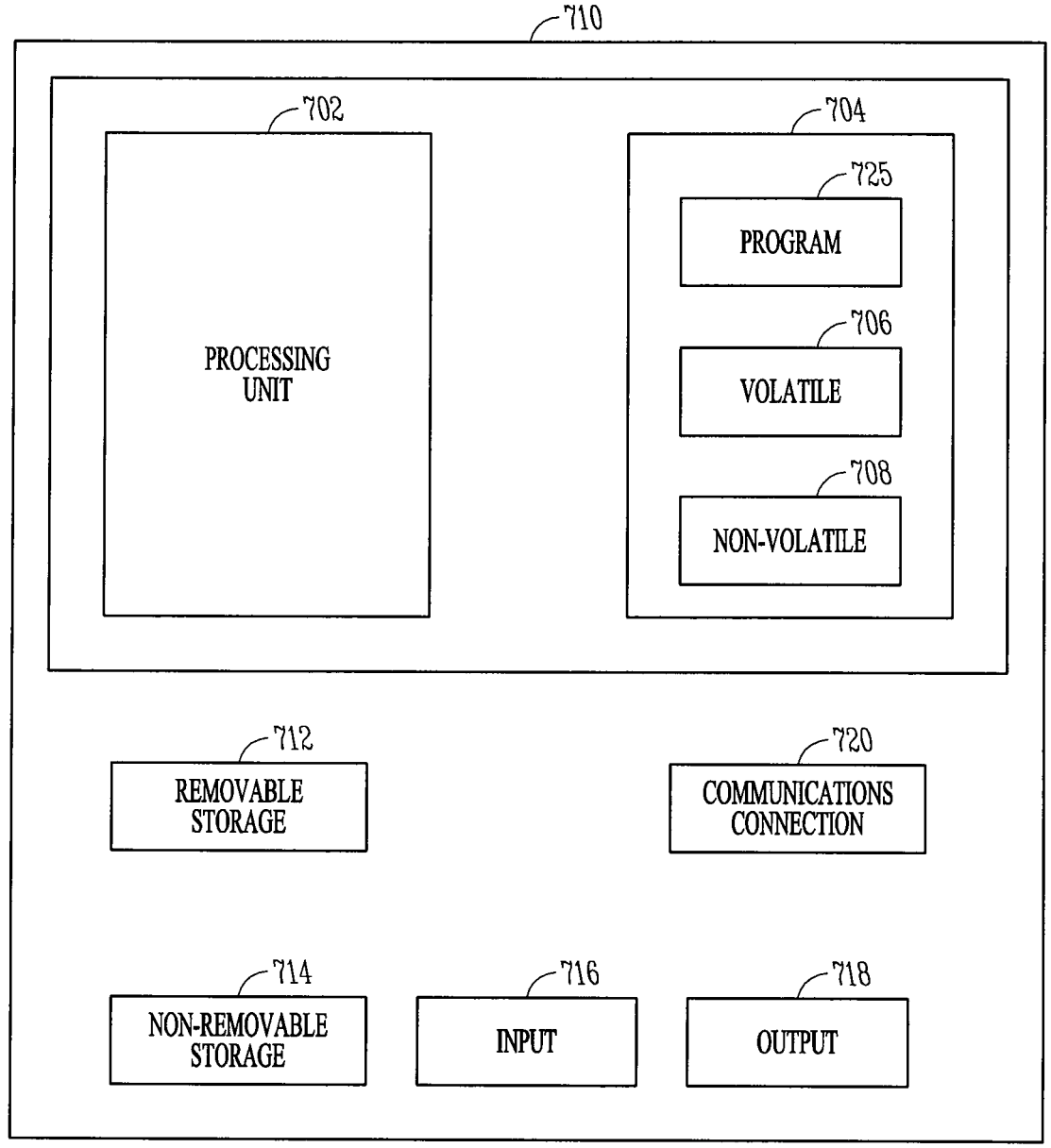
FIG. 7 is a block diagram of a typical computer system used to implement portions of methods according to an example embodiment.

In some embodiments, a computer system may form part of the system 10. A block diagram of an example computer system that executes programming for performing some of the methods described above is shown in FIG. 7.

A general computing device in the form of a computer 710, includes a processing unit 702 (e.g., processor 30), memory 704, removable storage 712, and non-removable storage 714. Memory 704 may include volatile memory 706 and non-volatile memory 708. Computer 710 may include— or have access to a computing environment that includes—a variety of computer-readable media, such as volatile memory 706 and non-volatile memory 708, removable storage 712 and non-removable storage 714. It should be noted that the databases referred to above for crating the synthetic image may be part of any of the processing unit 702 (e.g., processor 30), memory 704, volatile memory 706, non-volatile memory 708, removable storage 712, and non-removable storage 714.

Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions, as well as data, including video frames.

Computer 710 may include or have access to a computing environment that includes input 716, output 718, and a communication connection 720. In some example embodiments, the input 716 may allow a user to select the displayed size and level of detail within the simulated image. In addition, the output 718 may include a display that illustrates the overhead simulated image generated by the processor 30.

The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 710. A hard drive, CD-ROM, and RAM are some examples of articles including a computer-readable medium.

The Abstract of the Disclosure is provided to comply with 37 C.F.R. §1.72(b) with the understanding that it will not be used to interpret or limit the scope or meaning of the claims. The above description and figures illustrate embodiments of the invention to enable those skilled in the art to practice the embodiments of the invention. Thus the following claims are hereby incorporated into the Detailed Description, with each claim standing on its own as a separate embodiment.

The invention claimed is:

1. A method of displaying video surveillance fields of view limitations, the method comprising:
   loading a first set of data relating to the size and distance of objects in an entire area from a first vantage point into a database;
   loading a second set data relating to the size and distance of the objects in the same entire area from a second vantage point into the database;
   loading a global position of the first vantage point and the second vantage point into the database;
   determining a global position of the objects in the same entire area based on information in the database; and
   using information in the database to create a simulated overhead image of the same entire area from an orientation above the same entire area where there is no instrument collecting information or images, wherein the simulated overhead image identifies hidden locations within the same entire area that may not be seen by video surveillance from the first vantage point and the second vantage point.

2. The method of claim 1 further comprising:
   loading a first video image of the area from the first vantage point into the database;
   loading a second video image of the area from the second vantage point into the database; and
   wherein using information in the database to create a simulated overhead image of the same entire area from an orientation above the same entire area which identifies locations within the same entire area that may not be seen by video surveillance from the first the vantage point and the second vantage point includes identifying locations within the same entire area that may not be seen by the first video image and the second video image.

3. The method of claim 1 wherein loading a first video image of the same entire area includes recording the first video image with a first camera, and wherein loading a second video image of the same entire area includes recording the second video image with a second camera.

4. The method of claim 3 wherein recording the first video image is done simultaneously with recording the second video image.

5. The method of claim 4 wherein recording the first video image with the first camera includes positioning the first camera at the first vantage point, and wherein recording the second video image with the second camera includes positioning the second camera at the second vantage point.

6. The method of claim 1 wherein loading the first set of data into the database and loading the second set of data into the database includes using a lidar to obtain the first set of data and the second set of data.

7. The method of claim 1 wherein loading the first set of data into the database includes using a first lidar to obtain the first set of data and loading the second set of data into the database includes using a second lidar to obtain the second set of data.

8. The method of claim 7 wherein using the first lidar to obtain the first set of data includes positioning the first lidar at the first vantage point and using the second lidar to obtain the second set of data includes positioning the second lidar at the second vantage point.

9. The method of claim 8 wherein using the first lidar to obtain the first set of data is done simultaneously with using the second lidar to obtain the second set of data.

10. The method of claim 1 wherein determining a global position of the objects in the same entire area based on information in the database includes monitoring movement of the objects within the same entire area.

11. A video surveillance system comprising:
a lidar;
a global positioning system; and
a processor that receives data from the lidar relating to the size and distance of objects in an entire area from a first vantage point and data relating to the size and distance of objects in the same entire area from a second vantage point, the processor further receiving data from the global positioning system relating to global positions of the first vantage point and the second vantage point and based on the data creates a simulated overhead image of the same entire area from an orientation above the same entire area where there is no instrument collecting information or images, wherein the simulated overhead image identifies hidden locations within the same entire area that may not be seen by video surveillance from the first vantage point and the second vantage point.

12. The video surveillance system of claim 11 further comprising a video camera, wherein the video camera delivers surveillance video to the processor from the first vantage point and the second vantage point and based on the surveillance video the processor creates a simulated overhead image of the same entire area from an orientation above the same entire area which identifies locations within the same entire area that may not be seen by the video camera from the first vantage point and the second vantage point.

13. The video surveillance system of claim 12 wherein the video camera is a first video camera located at the first vantage point, and the video surveillance system further comprises a second video camera located at the second vantage point.

14. The video surveillance system of claim 13 wherein the first video camera and the second video camera simultaneously deliver surveillance video to the processor.

15. The video surveillance system of claim 11 wherein the lidar is a first lidar that delivers data to the processor relating to the size and distance of objects in the same entire area from the first vantage point, and the video surveillance system further comprises a second lidar that delivers data to the processor relating to the size and distance of objects in the same entire area from the second vantage point.

16. The video surveillance system of claim 15 wherein the first lidar and the second lidar simultaneously deliver data to the processor.

17. The video surveillance system of claim 15 wherein the first lidar, the second lidar and the global positioning system simultaneously deliver data to the processor.

18. The video surveillance system of claim 17 wherein the first lidar and the second lidar monitor movement of the objects within the same entire area.

19. A video surveillance system comprising:
a first lidar located at a first vantage point;
a second lidar located at a second vantage point;
a first video camera that delivers surveillance video from the first vantage point;
a second video camera that delivers surveillance video from the second vantage point;
a global positioning system; and
a processor that receives data from the first lidar and the second lidar relating to the size and distance of objects in an entire area from the first vantage point and data relating to the size and distance of objects in the same entire area from the second vantage point, the processor further receiving surveillance video from the first camera and the second camera, the processor further receiving data from the global positioning system relating to global positions of the first vantage point and the second vantage point and based on the data creates a simulated overhead image of the same entire area from an orientation above the same entire area where there is no instrument collecting information or images, wherein the overhead simulated image identifies hidden locations within the same entire area that may not be seen by first video camera and the second video camera.

20. The video surveillance system of claim 19 wherein the first lidar and the second lidar monitor movement of the objects within the same entire area.

* * * * *